UNITED STATES PATENT OFFICE.

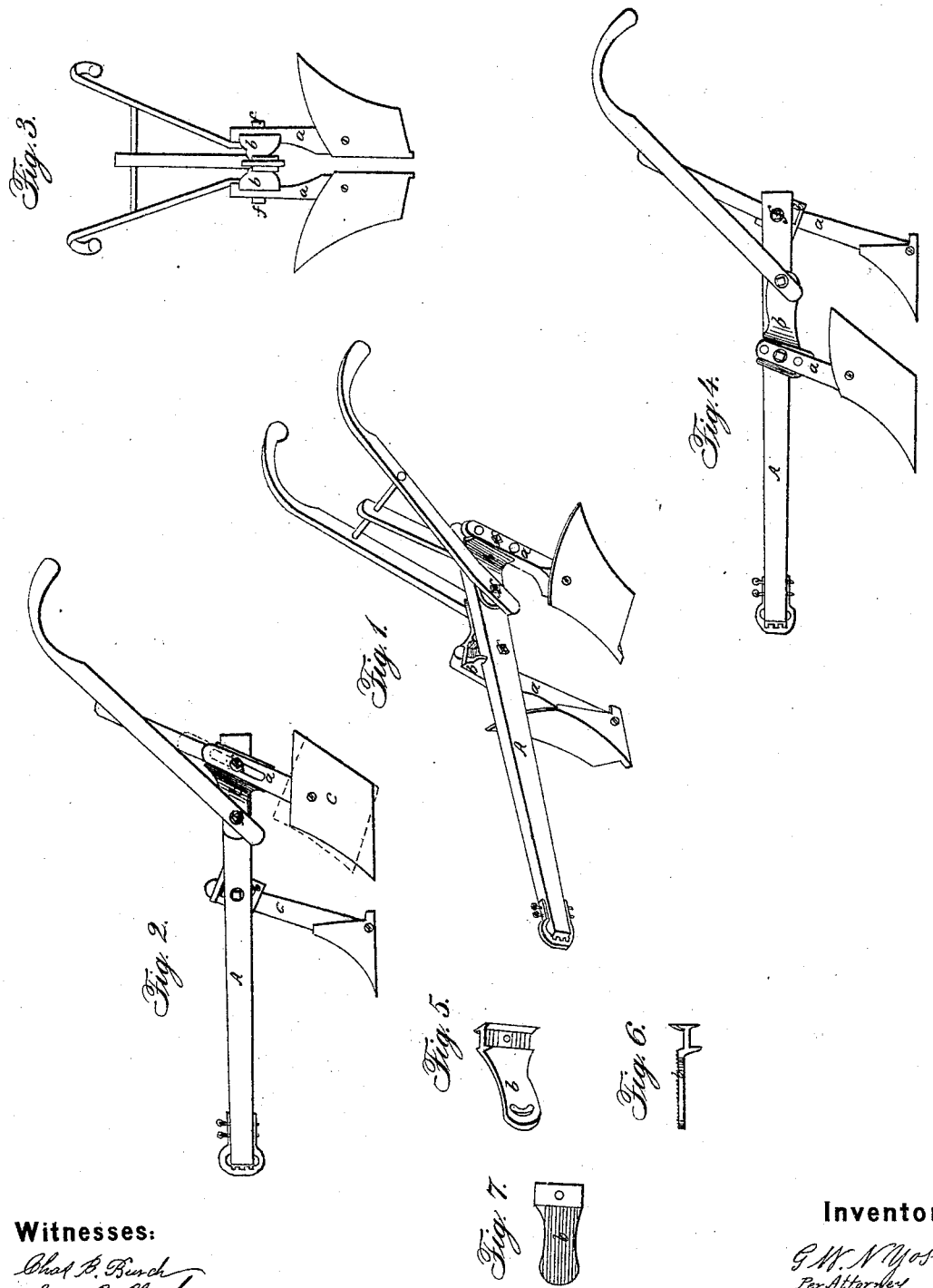

G. W. N. YOST, OF YELLOW SPRING, OHIO.

IMPROVEMENT IN CULTIVATORS.

Specification forming part of Letters Patent No. 29,934, dated September 4, 1860.

*To all whom it may concern:*

Be it known that I, G. W. N. YOST, of Yellow Springs, Green county, and State of Ohio, have invented a new and useful Improvement in Cotton Cultivators and Plows; and I do hereby declare that the following is a full and exact description thereof, reference being had to the accompanying drawings, and to the letters of reference marked thereon, in which—

Figure 1 is a perspective view with both right and left hand plow attached. Fig. 2 is a side view with plow and scraper attached. Fig. 3 is a front view with both plows attached parallel to each other. Fig. 4 is a view showing both attached, but reverse of what they are in Fig. 1. Fig. 5 is a side view of the sockets, showing the slot in front and the socket in rear corrugated on its face where the standard of plow or scraper is attached by means of bolt. Fig. 6 is an edge view of the socket; Fig. 7, a view of corrugated socket.

The nature of my invention consists in the manner of arranging the sockets to the beam and standards and the combination of the various parts together, as hereinafter described.

To enable others skilled in the art to make and use my invention, I will describe its construction and operation.

In the construction of the beam, standards, and handles they are much after the usual form or shape of other plows. The standards $a$ are all similarly made, and will fit in the sockets $b$ when it is desired to make a change of position of any one of them. The standard $a$, to which is attached the scraper $c$ in Fig. 2, has in it where it is attached to the beam A a slot extending in a perpendicular line, through which the bolt $d$ passes. The object of this slot is to allow of adjustability of said scraper up and down. The scraper $c$ is attached to standard $a$ by one bolt, which allows said scraper to move on said bolt to raise or lower the point of the scraper, as shown in red lines in Fig. 2, and by means of the slot $e$ the standard can be raised or lowered, as shown in red lines in Fig. 2. The plow is double—that is, it is a right and left hand plow, or a plow and scraper, as may be desired. The socket is made of casting, and has but one hole for a bolt at each end. At the front end it has a curve or bulge out from the beam, and has on its inner side a projection which rests on the beam, giving to it greater strength without weakening the beam. The projection on the other socket rests against the lower side of the beam for the same purpose, for as the plow meets with resistance in plowing the strain on the beam is equally divided between the bolt and projection which rests on the top of the beam. Also, there is a curved slot on the small end of the socket, which allows it to be adjusted, by which adjustment the plows or scraper is elevated or depressed at the point, thus causing it to run deeper or shallower, as desired, in the recess $d$, where the standard fits. The socket is corrugated for the purpose of preventing the standard from slipping when screwed firmly to its place. By these thus constructed I am able to easily and readily adjust my plow and scraper at will.

If I wish a right and left hand plow with one plow before the other, the standards $a$ are let into the groove $e'$ in socket $b$, and then placed to the beam, and the bolt $f$ is passed through the standard, socket, and beam and screwed fast by the nuts $g$. So with the standard and plow in the rear. These two plows, thus secured to the beam, as seen in Fig. 4, have the grooved ends of the sockets one to the rear and the other to the front end of the beam. When thus fastened the slotted ends of the sockets fit with their slotted holes to the holes of handles and the hole in the beam where the handles are attached. I then pass a bolt through handle-socket, beam-socket, and handle and firmly secure them all together, and thus form a right and left hand plow, as seen in Fig. 4.

If I wish to reverse the position of the plow, as above described, I only have to take out the bolts, attaching the plow to the beam, and reverse the sockets by turning them over, so that the front and rear ends are changed, (which is done without removing the bolt passing through the handles,) and attach the plow as before described, and I form a plow such as is seen in Fig. 1. In both these plows they are the same. The only difference is, that in Fig. 1 the right-hand plow is in front and the left-hand plow is in the rear, and in Fig. 4 the right and left hand plow are the reverse of this. This plow, when in this position, are the right and left hand plows, and may be used for opening the middle between the rows, or any other purpose for which a right and left hand plow could be wanted.

Fig. 3 represents the plow fastened to the beam parallel to each other, and they cut the furrow opposite to each other, and are for the purpose of throwing the ground from the cotton, as each plow passes one on each side of the row, leaving the row stand with the earth thrown from it.

Fig. 2 shows my invention with a plow and a scraper which is intended to be used, and as a plow and a scraper which is of importance to the planter in cultivating cotton. Another change may be made by which the plows may be set to turn the ridge of the furrows inside, and will be useful to bar up the row. This is done by simply reversing the plows and putting the landside of each plow on the inside, and they are attached as before to the beam.

Having thus described the nature of my invention, what I claim as new, and desire to secure by Letters Patent, is—

The arrangement of sockets $b$ with beam A and standards $a$, the whole being constructed as and for the purposes herein described.

G. W. N. YOST.

Witnesses:
JOHN CARSON,
DANIEL IKIRT.